(12) United States Patent
Yang

(10) Patent No.: US 9,771,015 B2
(45) Date of Patent: Sep. 26, 2017

(54) RATCHET BUCKLE

(71) Applicant: Fang-Lin Yang, Taichung (TW)

(72) Inventor: Fang-Lin Yang, Taichung (TW)

( * ) Notice: Subject to any disclaimer, the term of this patent is extended or adjusted under 35 U.S.C. 154(b) by 613 days.

(21) Appl. No.: 14/462,786

(22) Filed: Aug. 19, 2014

(65) Prior Publication Data
US 2016/0052442 A1  Feb. 25, 2016

(51) Int. Cl.
*B60P 7/08* (2006.01)
*B65B 13/02* (2006.01)

(52) U.S. Cl.
CPC ............ *B60P 7/083* (2013.01); *B65B 13/025* (2013.01); *Y10T 24/2115* (2015.01)

(58) Field of Classification Search
CPC ....... B60P 7/0823; B60P 7/083; B60P 7/0838; B60P 7/0846; B65B 13/025; Y10T 24/21; Y10T 24/2113; Y10T 24/2117; Y10T 24/2147; Y10T 24/2121; Y10T 24/2157; B66D 3/02
USPC ................................ 242/388.2; 254/213–227
See application file for complete search history.

(56) References Cited

U.S. PATENT DOCUMENTS

| | | | | |
|---|---|---|---|---|
| 7,758,023 B2 * | 7/2010 | Chang | ..................... | B60P 7/083 24/68 CD |
| 8,291,552 B2 * | 10/2012 | Gopal | ................. | A44B 11/125 24/68 CD |
| 9,227,551 B2 * | 1/2016 | Yang | ....................... | B60P 7/083 |
| 2006/0197072 A1 * | 9/2006 | Huang | .................... | B60P 7/083 254/217 |
| 2012/0267591 A1 * | 10/2012 | Bond | ...................... | B25B 25/00 254/222 |

* cited by examiner

*Primary Examiner* — Sang Kim
*Assistant Examiner* — Nathaniel Adams
(74) *Attorney, Agent, or Firm* — Rosenberg, Klein & Lee

(57) ABSTRACT

A ratchet buckle, which is configured to connect a first strap and a second strap, includes a controlling device, an operating device connected to the first strap, a reel passing through the controlling device and the operating device along an axial line, the second strap wound around the reel, at least one ratchet set mounted on the reel, the reel being not rotated relative to the ratchet set, and a pawl device. When the user wants to unwind the second strap from the reel, the user moves and rotates the controlling device smoothly with only one hand thereof; therefore, it's very convenient for the user to operate. The special structure making the ratchet set unidirectionally rotatable, and it doesn't need any further structure, so that it is lighter and has lower cost.

13 Claims, 16 Drawing Sheets

RATCHET BUCKLE

BACKGROUND OF THE INVENTION

Field of the Invention

The present invention relates to a buckle, and more particularly to a ratchet buckle for binding articles.

Description of the Prior Art

Referring to FIG. 1, when a truck carries an article, a user usually uses a conventional ratchet buckle 1 to bind the article, so as to prevent the article from unexpectedly dropping down from the truck. The conventional ratchet buckle 1 comprises a first strap 11, a second strap 12, a controlling device 13, an operating device 14, a reel 15 and two ratchet wheels 16. The operating device 14 is connected to the first strap 11. The reel 15 passes through the controlling device 13 and the operating device 14 along an axial direction. The two ratchet wheels 16 are respectively mounted around two ends of the reel 15. The reel 15 is not rotated relative to the two ratchet wheels 16. The controlling device 13 has a plate unit 131. The plate unit 131 is engaged with the ratchet wheels 16 or disengaged from the ratchet wheels 16. The operating device 14 has a pawl member 141. The pawl member 141 allows the ratchet wheels 16 to be only clockwise rotated.

When a user operates the conventional ratchet buckle 1, an article is bound with the first strap 11 and the second strap 12; the user rotates the controlling device 13 clockwise, the ratchet wheels 16 are rotated clockwise by said rotation and the reel 15 is rotated clockwise by the rotation of the ratchet wheels 16; wherein, the pawl member 141 is disengaged form the ratchet wheels 16 step by step and the plate unit 131 is engaged with the ratchet wheels 16. As a result, a certain length of the second strap 12 is wound around the reel 15 via the rotation of the reel 15.

Thereafter, the user rotates the controlling device 13 counterclockwise, the ratchet wheels 16 are not rotated counterclockwise by said rotation; wherein, the pawl member 141 is engaged with the ratchet wheels 16 and the plate unit 131 is disengaged from the ratchet wheels 16 step by step. Therefore, the user continues rotating the controlling device 13 clockwise, so as to continue winding the certain length of the second strap 12 around the reel 15, so that the article is tightly bound.

When the user wants to unwind the second strap 12 from the reel 15, the user stirs the plate unit 131 away from the ratchet wheels 16, and rotates the controlling device 13 clockwise until the controlling device 13 and the operating device 14 are almost parallel with each other; as a result, an extending portion (not shown) of the controlling device 13 pushes the pawl member 141 away from the ratchet wheels 16. Therefore, the reel 15 is freely rotatable, because the ratchet wheels 16 is disengaged from the plate unit 131 and the pawl member 141.

However, there are some disadvantages of the conventional ratchet buckle 1 as following:

First, a structure of the conventional ratchet buckle 1 is complicated and overweight thereof, because of an arrangement of the plate unit 131 and the pawl member 141.

Second, an unexpected disengagement between the pawl member 141 and the ratchet wheels 16 might often happen, because a strain of the second strap 12 always pulls the ratchet wheels 16 away from the pawl member 141.

Third, under the conventional ratchet buckle 1, the disengagement makes louder noise, because the plate unit 131 or the elastic pawl 141 is disengaged from the ratchet wheels 16, via elasticity thereof. Therefore, the conventional ratchet buckle 1 is unsuitable at night.

The present invention is, therefore, arisen to obviate or at least mitigate the above mentioned disadvantages.

SUMMARY OF THE INVENTION

An object of the present invention is to provide a safety buckle.

To achieve the above and other objects, a ratchet buckle, which is configured to connect a first strap and a second strap, comprises a controlling device; an operating device connected to the first strap; a reel passing through the controlling device and the operating device along an axial line, the second strap wound around the reel; a pawl device having a first through hole and at least one first pawl member, the first through hole formed on the operating device therethrough, along the axial line, the reel passing through the through holes, the first pawl member defined on an inner wall of the first through hole; and at least one ratchet set mounted on the reel, the reel being not rotated relative to the ratchet set, at least a portion of the ratchet set received in the first through hole, the ratchet set movable in the first through hole via an outer force, between a first position under which the first pawl member is engaged with the ratchet set so that the ratchet set is rotatable in one direction, and a second position under which the first pawl member is disengaged from the ratchet set so that the ratchet set is rotatable in one direction or the other opposite direction.

All in all, the advantages of the present invention are shown as following:

First, the strain of the second strap have the ratchet set be always engaged with the pawl device; in other words, the user never worries that the ratchet set might be unexpectedly disengaged from the pawl device during operation, so that it is very safe. Furthermore, the special structure making the ratchet set unidirectionally rotatable, and it doesn't need any further structure, so that it is lighter and has lower cost.

Second, the disengagement makes quieter noise, so that the ratchet buckle of the present invention is suitable at night.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 2:
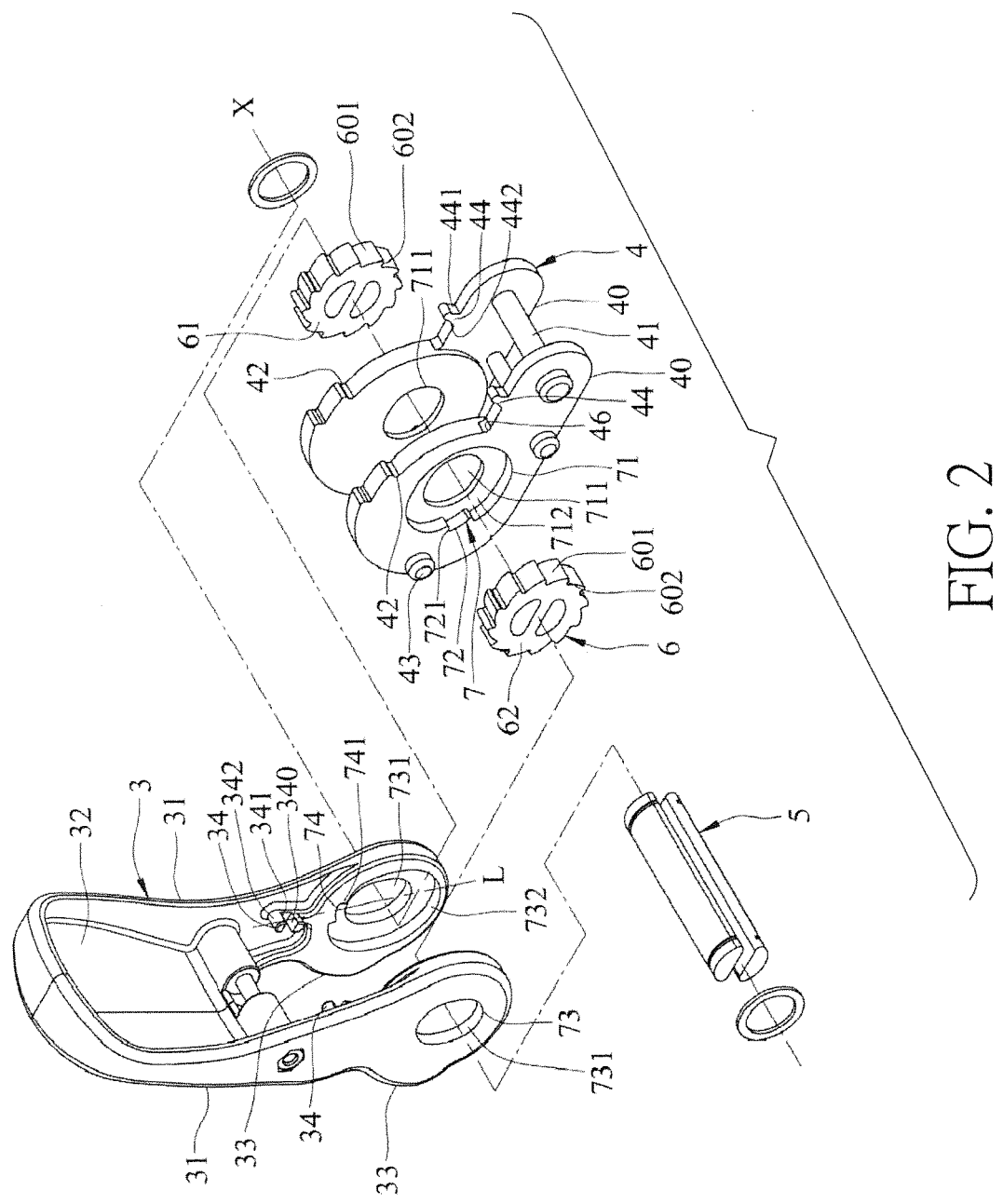
FIG. 2 is an exploded view of a first embodiment of the present invention.
Figure 3:
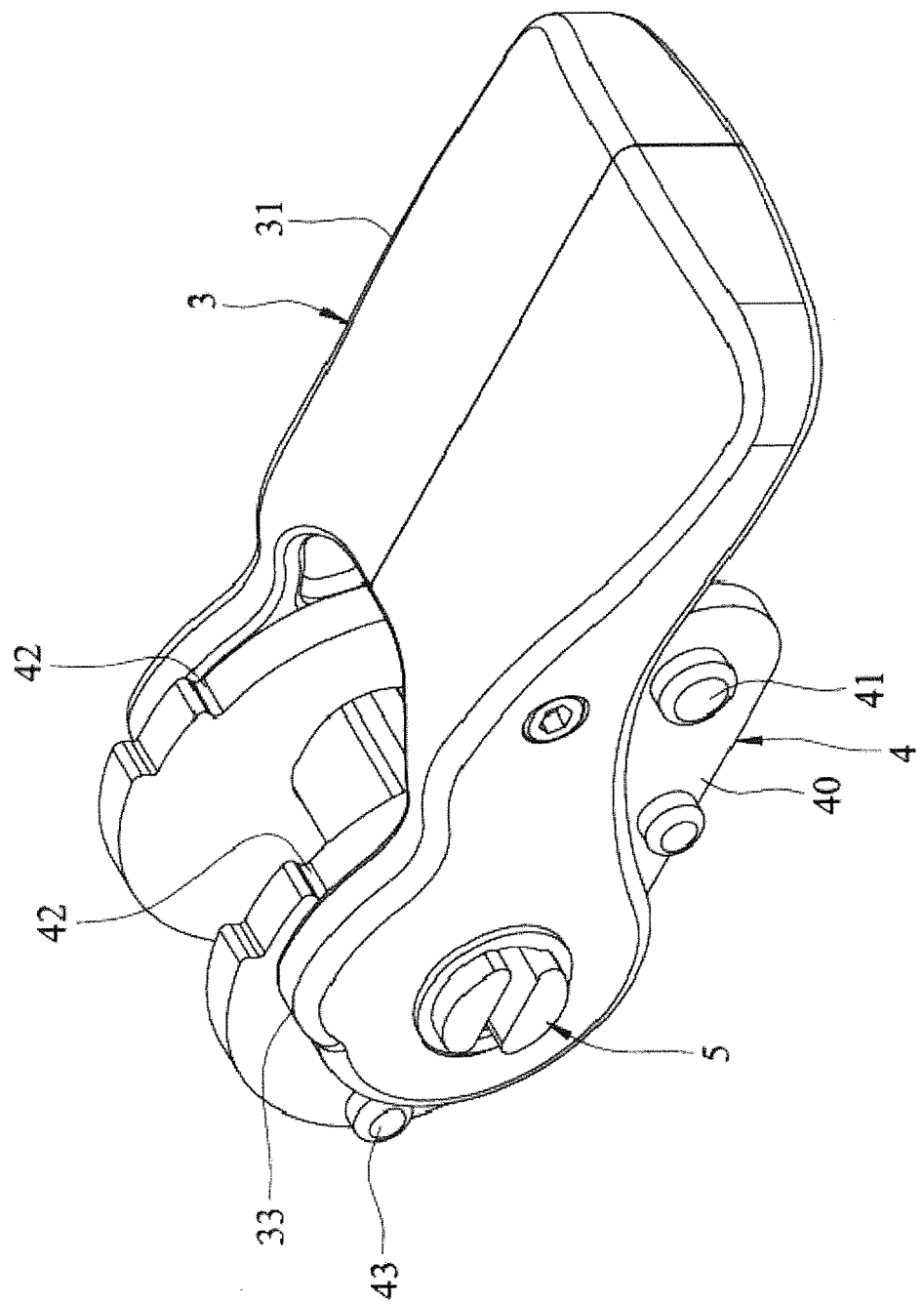
FIG. 3 is a perspective view of the first embodiment of the present invention.
Figure 4:
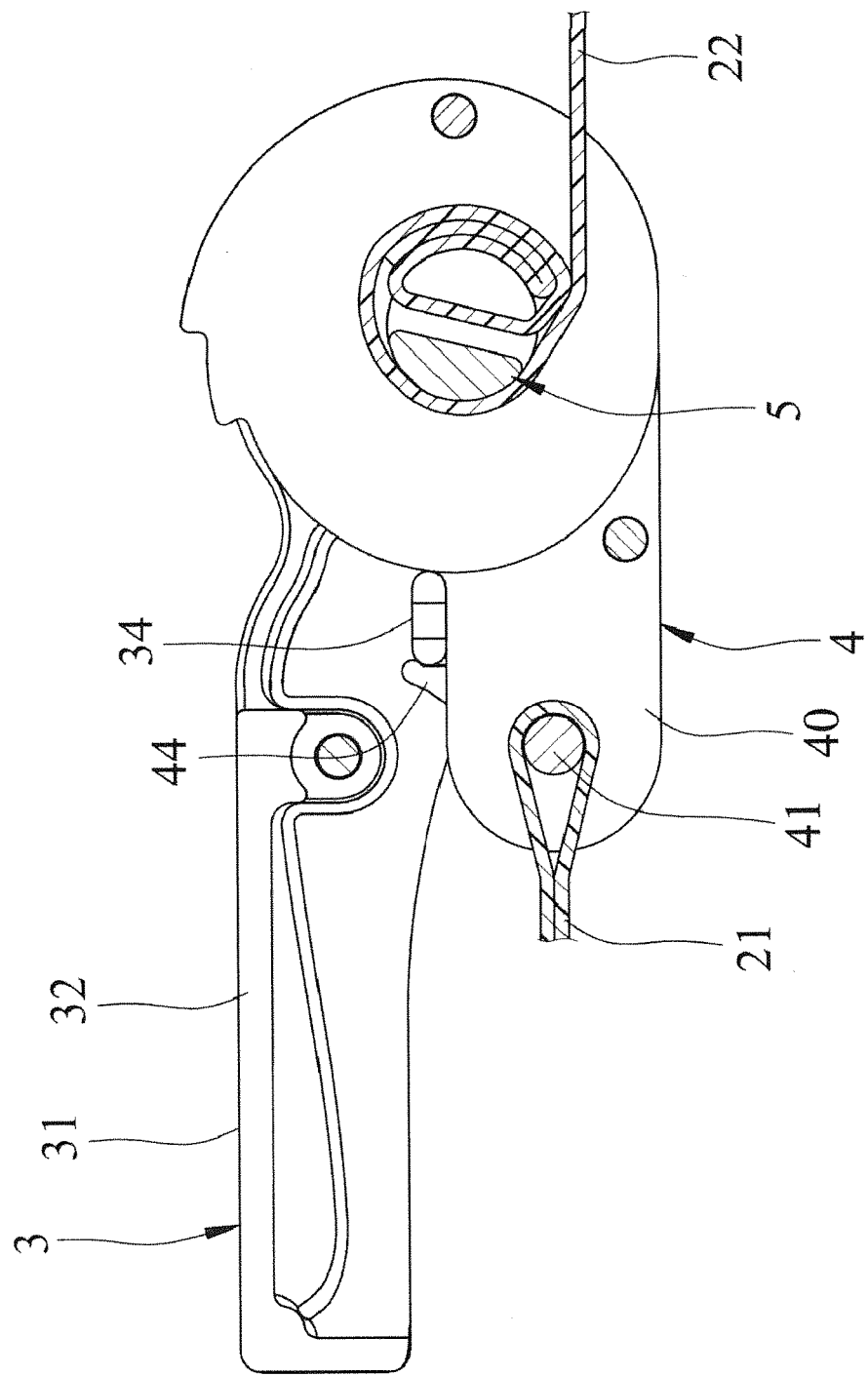
FIG. 4 is a cross-sectional view of the first embodiment of the present invention.

Referring to FIGS. 2-4, a first embodiment of the present invention is described as follows. A ratchet buckle in accordance with the present invention is configured to connect a first strap 21 and a second strap 22. The ratchet buckle comprises a controlling device 3, an operating device 4, a reel 5, a ratchet set 6 and a pawl device 7. The controlling device 3 has two connectors 31, a handle 32, two extending portions 33 and two extending rods 34. The handle 32 is connected between the two connectors 31. Each extending portion 33 is defined at one end of each corresponding connector 31. Each extending rod 34 is formed at one end inner face of each corresponding connector 31. Each extending rod 34 has a notch 340, a first abutting face 341 and a second abutting face 342. The first abutting face 341 is formed at the notch 340 and is back on to the handle 32. The second abutting face 342 is formed at a top side of each extending rod 34 and is opposite to the handle 32.

The operating device 4 has two wall members 40, a rod member 41, two abutting portions 42, two extruded portions 43 and two catch members 44. The two wall members 40 are spaced from each other. The rod member 41 is connected between two ends of the two wall members 40. The rod member 41 is connected to the first strap 21. Each abutting portion 42 is formed at a top side of each corresponding wall member 40. Each extruded portion 43 is formed at a rear end of each corresponding wall member 40. Each catch member 44 is formed at the top side of each corresponding wall member 40. Each extruded portion 43 is extruded by extrusion process, so that each extruded portion 43 and each corresponding wall member 40 are formed as one piece. Each catch member 44 has a lateral face 441 and an inclined face 442. The lateral face 441 is back on to each corresponding extruded portion 43. The inclined face 442 is opposite to each corresponding extruded portion 43. The inclined face 442 is inclined from a top end thereof to a bottom end thereof. The bottom end is closer to each corresponding extruded portion 43 than the top end of the inclined face 442.

The reel 5 passes through the two connectors 31 of the controlling device 3 and the two wall members 40 of the operating device 4, along an axial line X. The second strap 22 is wound around the reel 5.

The ratchet set 6 has an inner ratchet wheel 61 and an outer ratchet wheel 62 spaced from the inner ratchet wheel 61. The inner ratchet wheel 61 and the outer ratchet wheel 62 are respectively mounted around two ends of the reel 5. The reel 5 is not rotated relative to the ratchet set 6. Each ratchet wheel 61 or 62 has a plurality of disengaging faces 601 and a plurality of engaging faces 602. The disengaging faces 601 are extended from a periphery of each ratchet wheel 61 or 62. Each engaging face 602 is adjacent to each corresponding disengaging face 601. Specially, the inner ratchet wheel 61 and the outer ratchet wheel 62 might be formed as one piece in another embodiment of the present invention. The size of the inner ratchet wheel 61 might be larger than or the same as that of the outer ratchet wheel 62.

The pawl device 7 has two first through holes 71, two first pawl members 72, two second through holes 73 and two second pawl members 74. Each first through hole 71 is formed on each corresponding wall member 40 therethrough, along the axial line X. The reel 5 passes through the two first through holes 71 on the two wall members 40. Each first pawl member 72 is defined on an inner wall of each corresponding first through hole 71. Each second through hole 73 is formed on each corresponding connector 31 therethrough, along the axial line X. The reel 5 passes through the two second through holes 73 on the two connectors 31. Each second pawl member 74 is defined on an inner wall of each corresponding second through hole 73. Each second pawl member 74 is opposite to each corresponding first pawl member 72. Each first through hole 71 and each second through hole 73 are substantially slot-shaped. A central line L is defined by two end points of each second through hole 73 which is slot-shaped (as shown in FIG. 2). The axial line X and the central line L are crossed, so that an angle is defined by the axial line X and the central line L. Each first through hole 71 has a first through portion 711 and a first receiving portion 712. Each second through hole 73 has a second through portion 731 and a second receiving portion 732. A diameter of the first through portion 711 or the second through portion 731 is longer than that of the reel 5. A diameter of the first receiving portion 712 or the second receiving portion 732 is longer than that of the first through portion 711 or the second through portion 731. The first receiving portion 712 and the second receiving portion 732 are configured to receive each corresponding ratchet wheel 61 or 62 of the ratchet set 6. Clearly, each first pawl member 72 is defined at the first receiving portion 712 of each corresponding first through hole 71. Each second pawl member 74 is defined at the second receiving portion 732 of each corresponding second through hole 73. Each first pawl member 72 and each second pawl member 74 respectively have a first engaging portion 721 and a second engaging portion 741. The first engaging portion 721 and the second engaging portion 741 both correspond to the engaging faces 602.

Figure 6:
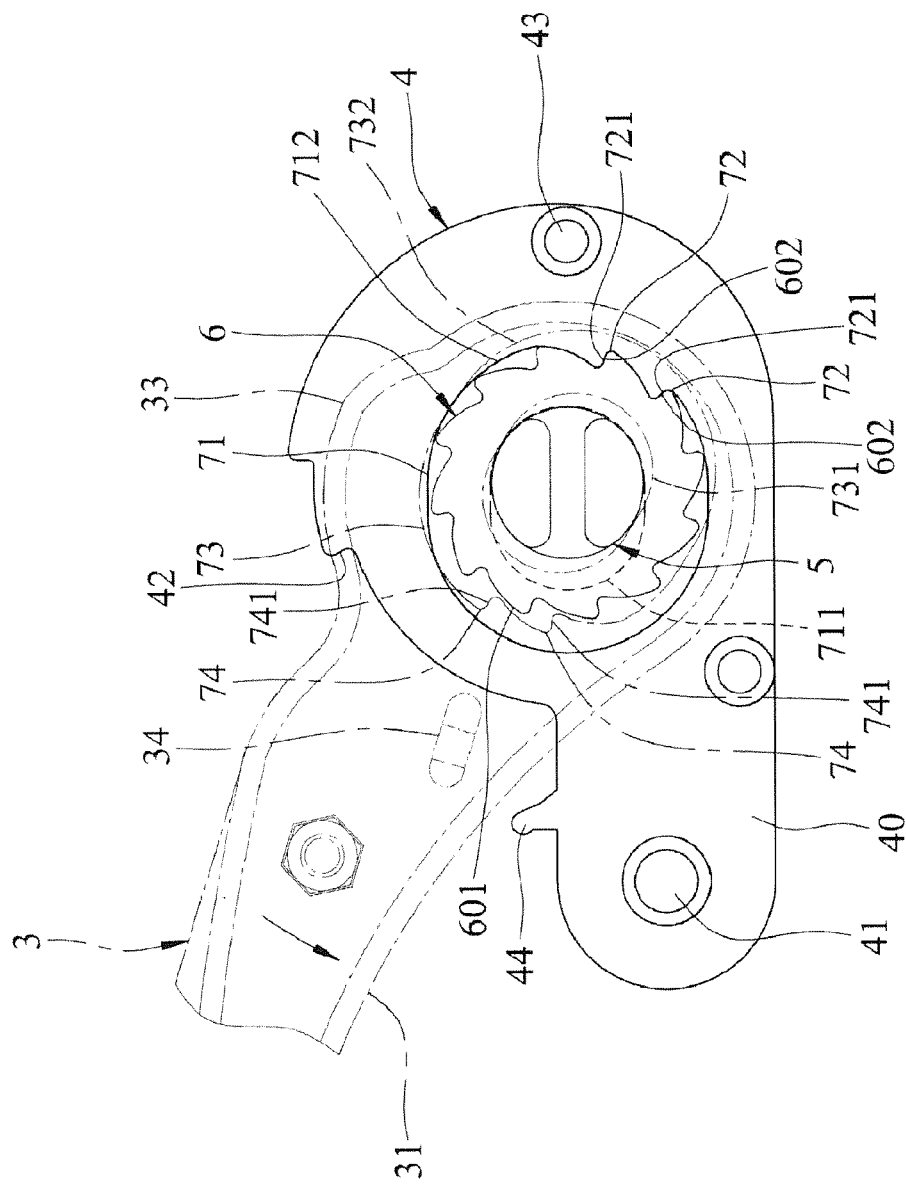
FIG. 6 is a side view of the first embodiment for showing a controlling device being counterclockwise rotated.

Referring to FIGS. 3-4 and 6, when a user operates the present invention, an article is bound with the first strap 21 and the second strap 22; a strain of the second strap 22 pulls the reel 5 toward an inner wall of the first through portion 711 of each first through hole 71 until the reel 5 abuts against the inner wall of the first through portion 711 of each first through hole 71; as a result, each ratchet wheel 61 or 62 of the ratchet set 6 at the reel 5 is further engaged with the two first pawl members 72, wherein the first engaging portion 721 of each first pawl member 72 abuts against one engaging faces 602 of the ratchet set 6. Therefore, the ratchet set 6 and the reel 5 cannot be rotated counterclockwise, but can be rotated clockwise.

Figure 5:
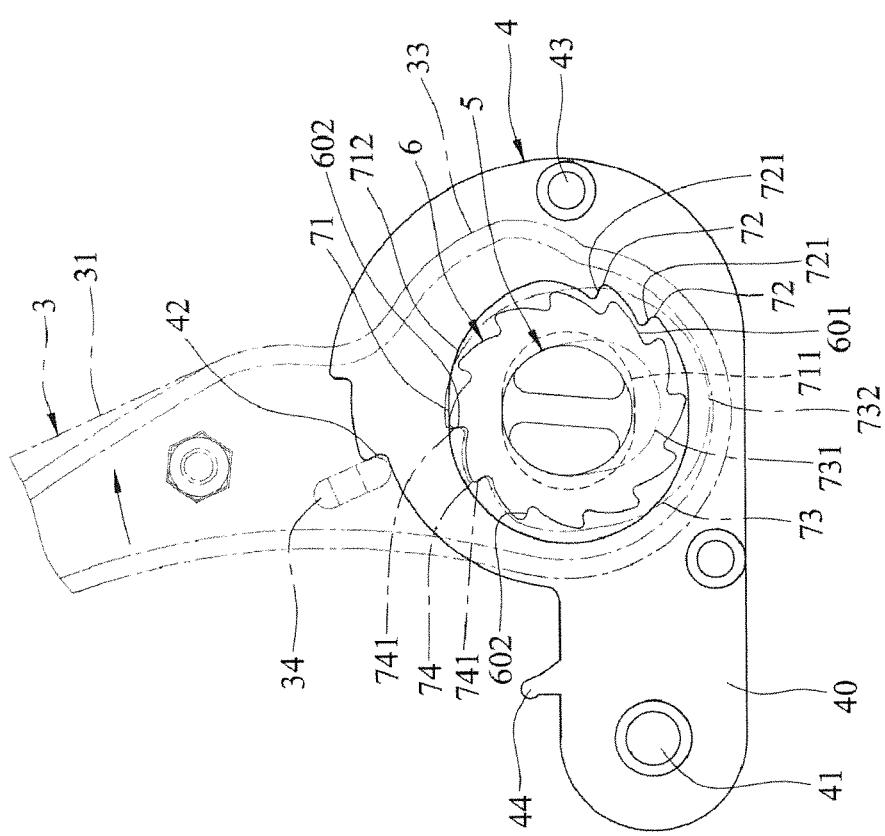
FIG. 5 is a side view of the first embodiment for showing a controlling device being clockwise rotated.

Referring to FIGS. 4-5, when the user pushes the controlling device 3 toward the reel 5 to a lock position and rotates the controlling device 3 clockwise, the ratchet set 6 is rotated clockwise by said rotation, until each extending rod 34 abuts against each corresponding abutting portion 42;

wherein, the second engaging portion 741 of each second pawl member 74 is engaged with one engaging face 602 of the ratchet set 6; simultaneously, the first engaging portion 721 of each first pawl member 72 is disengaged from the disengaging faces 601 step by step, until each extending rod 34 abuts against each corresponding abutting portion 42. As a result, the reel 5 is rotated clockwise by the rotation of the ratchet set 6 until each extending rod 34 abuts against each corresponding abutting portion 42, so that a certain length of the second strap 22 is wound around the reel 5 via the rotation of the reel 5.

Referring to FIGS. 5-6, thereafter, when the user rotates the controlling device 3 counterclockwise, the ratchet set 6 is not rotated counterclockwise by said rotation; wherein, the second engaging portion 741 of each second pawl member 74 is disengaged from the disengaging faces 601 step by step; simultaneously, the first engaging portion 721 of each first pawl member 72 is engaged with one engaging face 602. In addition, the controlling device 3 is moved toward the reel 5 with the motion of the second through portion 731 of each second through hole 73. As a result, the reel 5 and the ratchet set 6 are not rotated counterclockwise, so that the second strap 22 would not be unwound from the reel 5 because the reel 5 is not rotated counterclockwise. Thereafter, the user continues rotating the controlling device 3 clockwise, so as to further wind the certain length of the second strap 22 around the reel 5.

Figure 7:
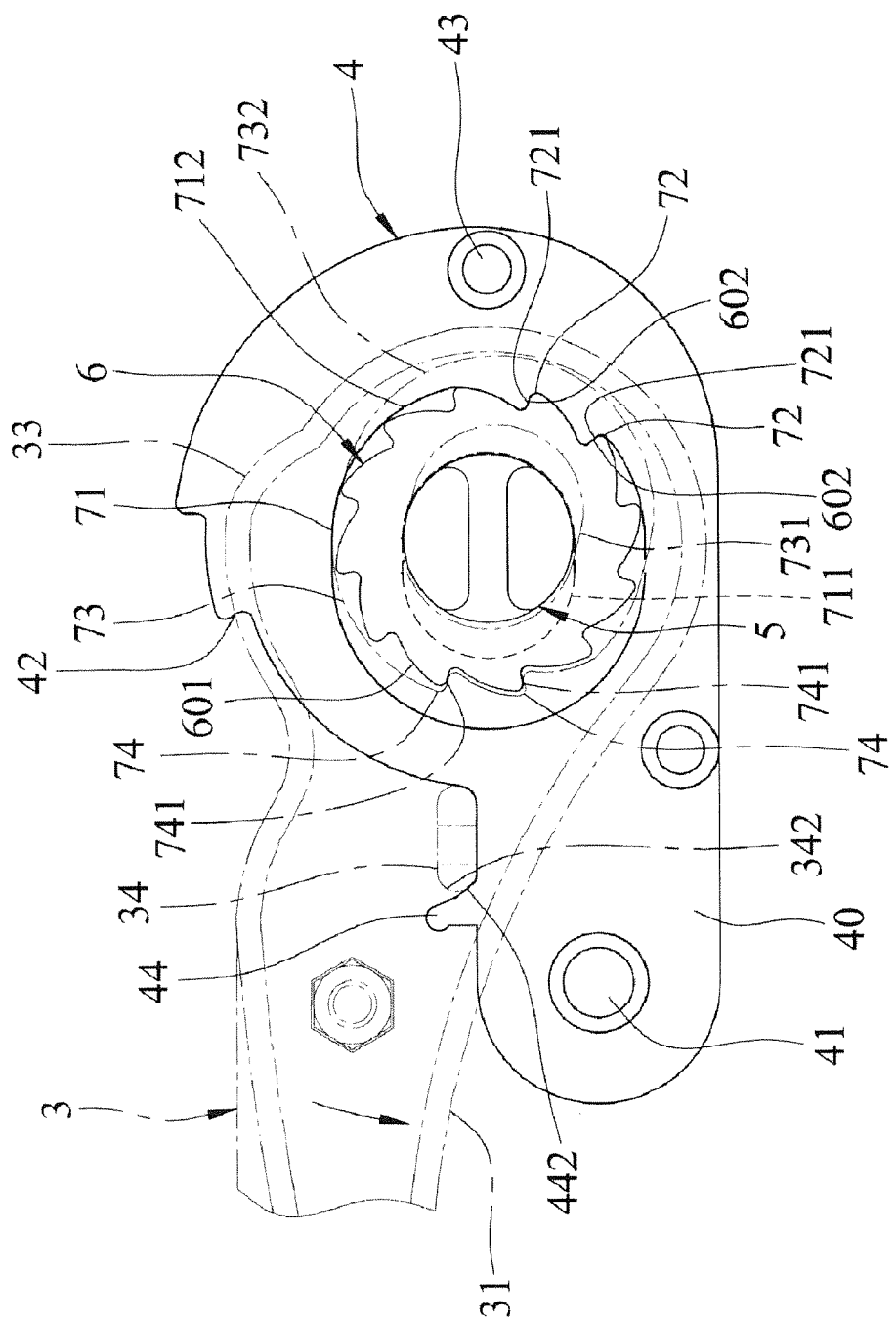
FIG. 7 is a side view of the first embodiment for showing a first extruded portion being engaged with a notch.

Referring to FIG. 7, when the user does not want to wind the second strap 22 around the reel 5 any more, the user rotates the controlling device 3 counterclockwise, so as to have the inclined face 442 of each catch member 44 abut against the second abutting face 342 of each corresponding extending rod 34; then, the controlling device 3 moves the reel 5 toward each first pawl member 72 in each corresponding first through hole 71, with the abutting relation between the inclined face 442 and the second abutting face 342 of each corresponding extending rod 34, until the ratchet buckle is completely folded up; as a result, the controlling device 3 is locked by the inclined face 442 and the ratchet set 6 is engaged with each first pawl member 72 and each second pawl member 74, so that the ratchet set 6 and the reel 5 are prevented from unexpectedly rotating.

Figure 8:
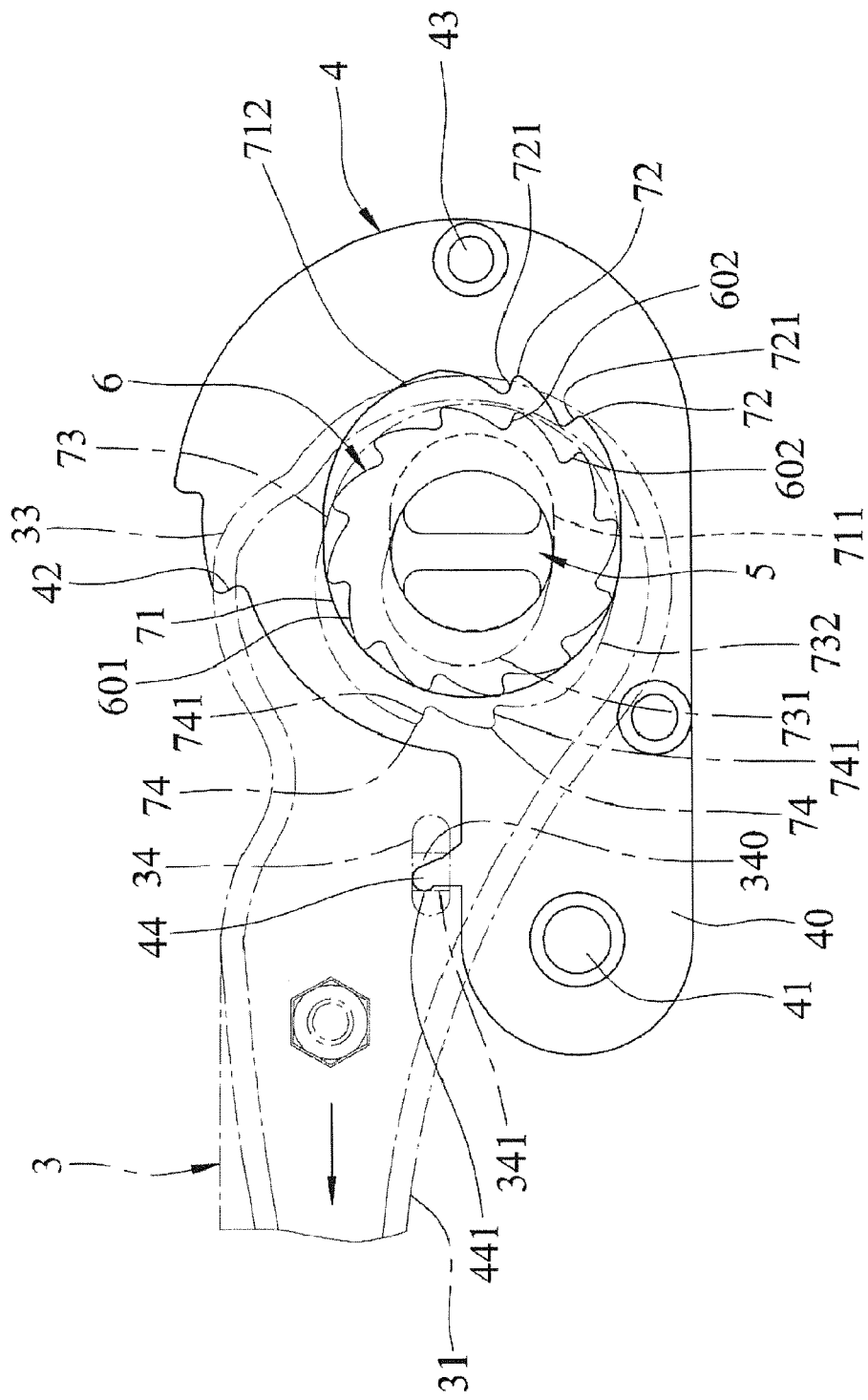
FIG. 8 is a side view of the first embodiment for showing a reel being freely rotatable under one state.

Referring to FIG. 8, a first unwinding method is described. When the user wants to unwind the second strap 22 from the reel 5, the user holds the handle 32 and pulls the controlling device 3 away from the reel 5 to a unlock position, and rotates the controlling device 3 counterclockwise until the first abutting face 341 of each extending rod 34 abuts against the lateral face 441 of each corresponding catch member 44 and the ratchet buckle is completely folded up; wherein, each extending portion 33 moves the reel 5 in the first through portion 711 of each first through hole 71, so as to disengage the first engaging portion 721 of each first pawl member 72 and the second engaging portion 741 of each second pawl member 74 from the ratchet set 6. As a result, the controlling device 3 is locked so as to prevent each first pawl member 72 and each second pawl member 74 from being engaged with the ratchet set 6 once more, so that the reel 5 is freely rotated clockwise or counterclockwise because the ratchet set 6 is not engaged.

Figure 9:
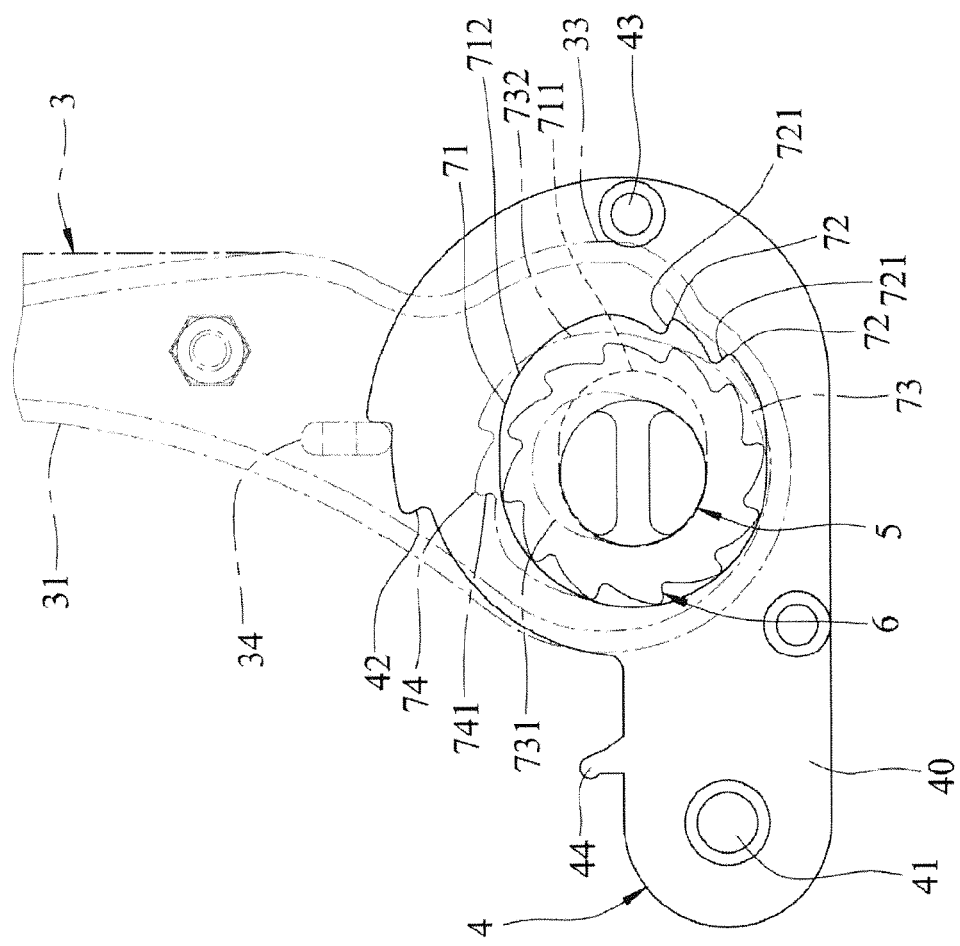
FIG. 9 is a side view of the first embodiment for showing a reel being freely rotatable under another state.

Referring to FIG. 9, a second unwinding method is described. When the user wants to unwind the second strap 22 from the reel 5, the user holds the handle 32 and pulls the controlling device 3 away from the reel 5 to a unlock position (as shown in FIG. 4), so as to disengage the second engaging portion 741 of each second pawl member 74 from the ratchet set 6. Then, the user rotates the controlling device 3 clockwise until the ratchet buckle is completely unfolded, wherein each extruded portion 43 abuts against each corresponding extending portion 33 so that the controlling device 3 moves the reel 5 in the first through portion 711 of each first through hole 71 and moves the ratchet set 6 in the first receiving portion 712 of each first through hole 71, so as to disengage the first engaging portion 721 of each first pawl member 72 from the ratchet set 6. As a result, the reel 5 is freely rotated clockwise or counterclockwise because the ratchet set 6 is not engaged with the first pawl members 72 and the second pawl members 74.

Figure 10:
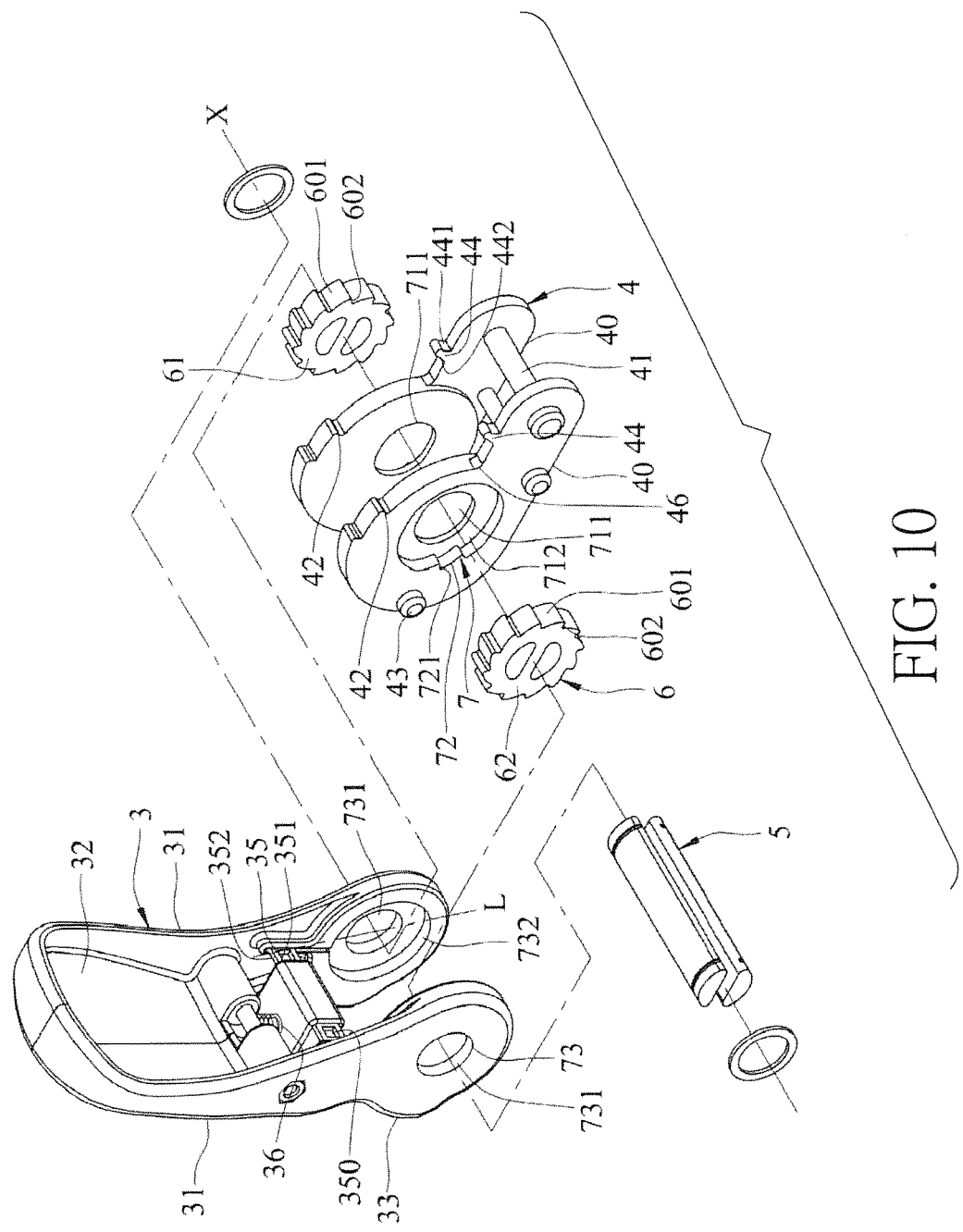
FIG. 10 is an exploded view of a second embodiment of the present invention.
Figure 11:
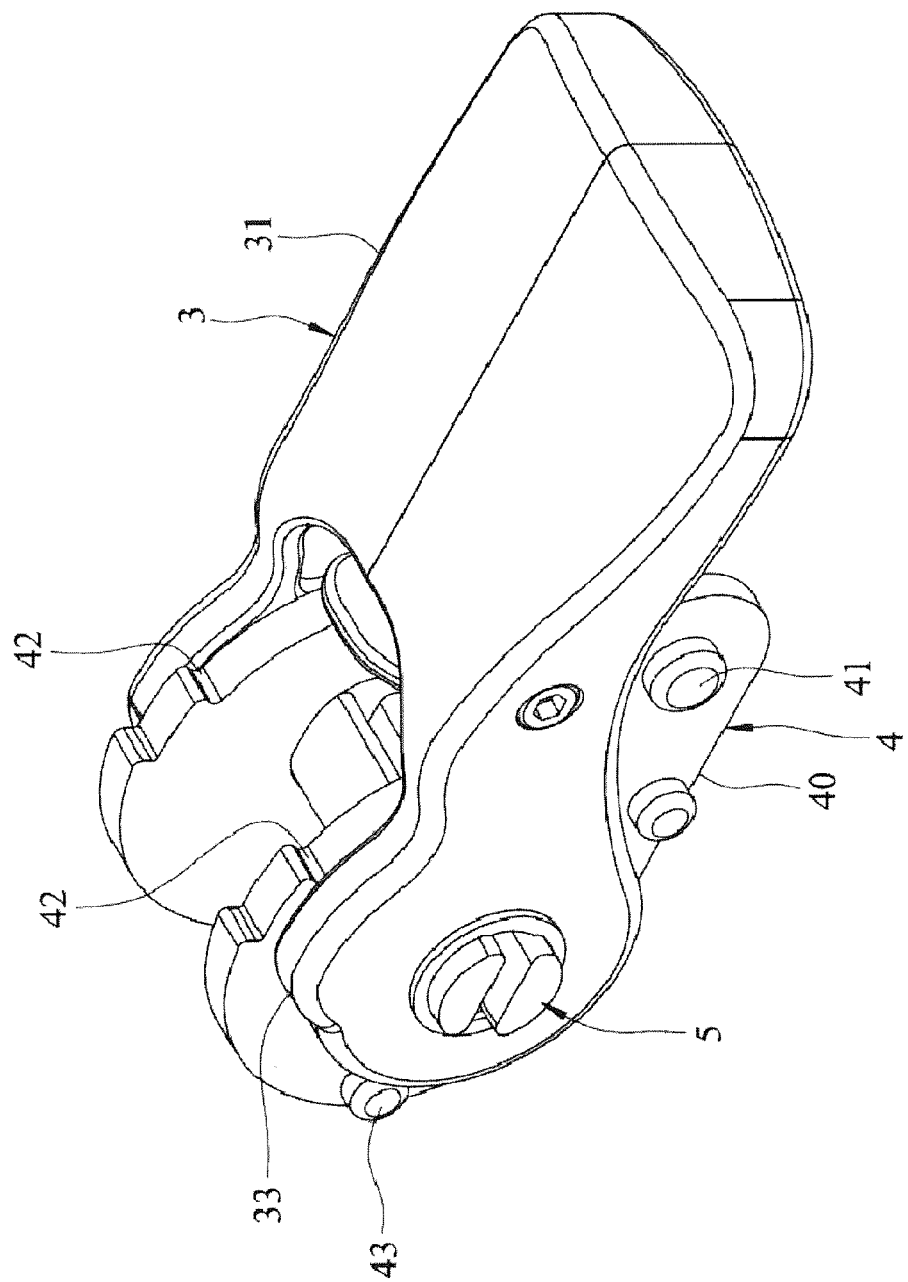
FIG. 11 is a perspective view of the second embodiment of the present invention.

Referring to FIGS. 10-11, a second embodiment of the present invention is described as following (only the differences between the first embodiment and the second embodiment are further described). A ratchet buckle in accordance with the second embodiment comprises a controlling device 3, an operating device 4, a reel 5, a ratchet set 6, as first embodiment. The controlling device 3 has a pawl plate 35 and an elastic member 36 which replace the second pawl members 74 of the first embodiment. The pawl plate 35 is movably assembled between the two connectors 31. The elastic member 36 is assembled on the pawl plate 35 and the two connectors 31. The pawl plate 35 has two notches 350, two first abutting faces 351 and two second abutting faces 352. The two notches 350 are respectively defined at two ends of the pawl plate 35. Each first abutting face 351 is formed at each corresponding notch 350 and is back on to the handle 32. Each second abutting face 352 is formed at a top side of the pawl plate 35 and is opposite to the handle 32. Each second through hole 73 is circular and fits the reel 5. A recovery force of the elastic member 36 has the pawl plate 35 engage with the ratchet set 6.

Figure 12:
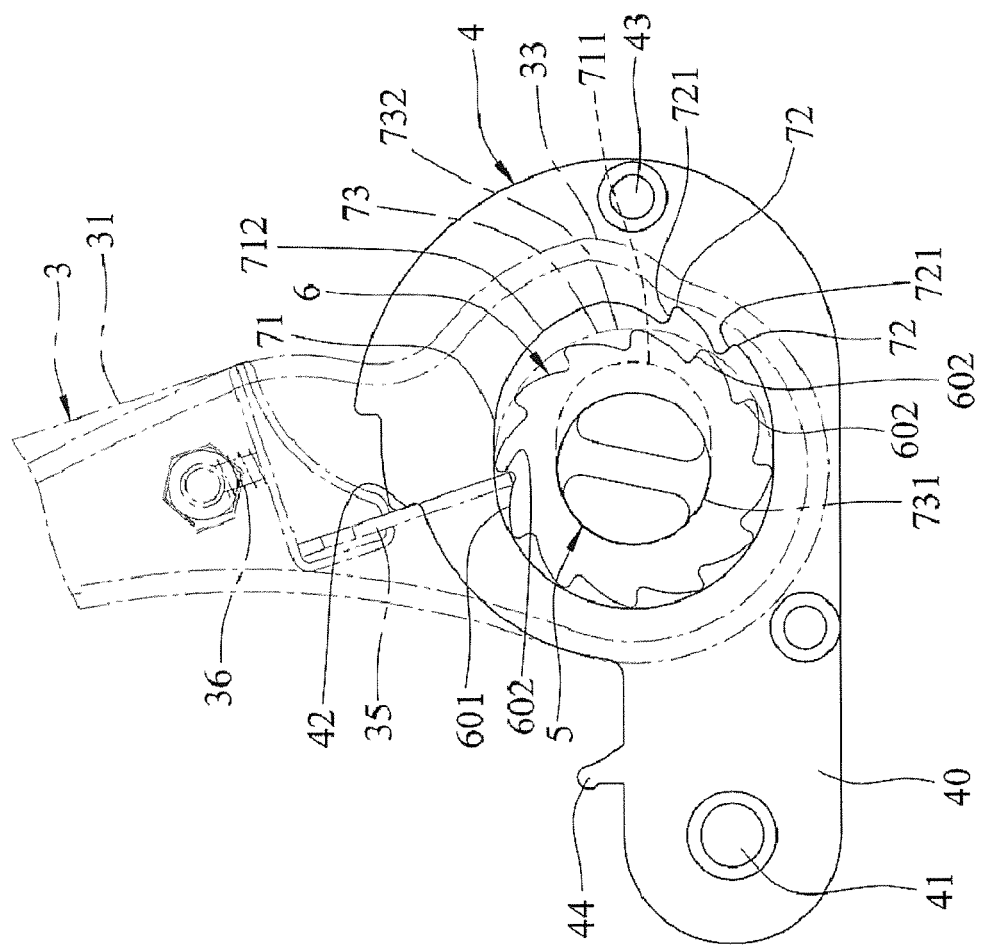
FIG. 12 is a side view of the second embodiment for showing a controlling device being clockwise rotated.

Referring to FIG. 12, when the user pushes the controlling device 3 toward the reel 5 and rotates the controlling device 3 clockwise, the ratchet set 6 is rotated clockwise in the first receiving portion 712 by said rotation; wherein, the pawl plate 35 is engaged with the engaging faces 602 of the ratchet set 6; simultaneously, each first pawl member 72 is disengaged from the disengaging faces 601 step by step. As a result, the reel 5 is rotated clockwise by the rotation of the ratchet set 6, so that the certain length of the second strap 22 is wound around the reel 5 via the rotation of the reel 5.

Figure 13:
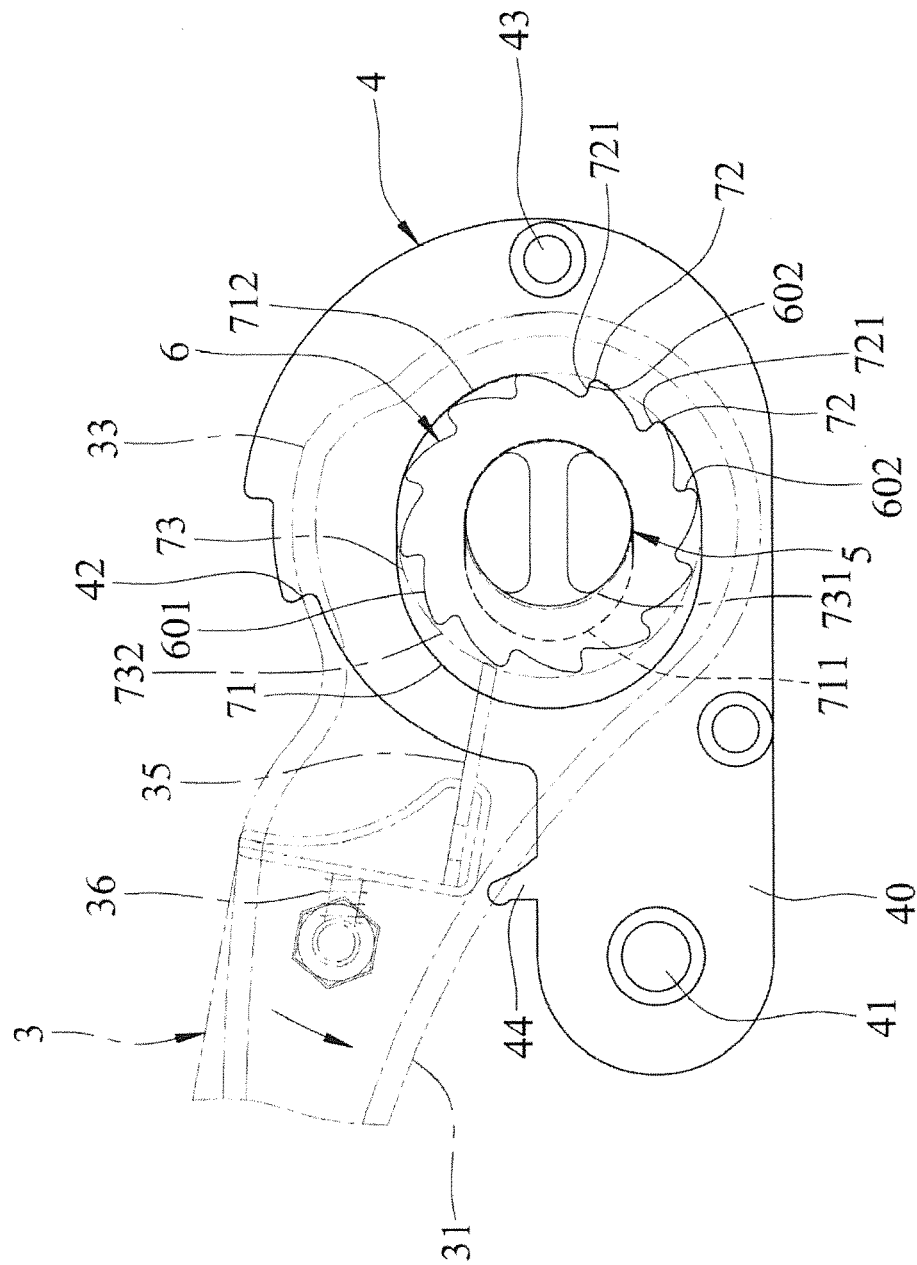
FIG. 13 is a side view of the second embodiment for showing the controlling device being counterclockwise rotated.

Referring to FIG. 12-13, thereafter, when the user rotates the controlling device 3 counterclockwise, the ratchet set 6 is not rotated counterclockwise by said rotation; wherein, the pawl plate 35 of the controlling device 3 is disengaged from the disengaging faces 601 of the ratchet set 6 step by step via the recovery force of the elastic member 36; simultaneously, each first pawl member 72 is engaged with one engaging face 602 of the ratchet set 6. As a result, the reel 5 and the ratchet set 6 are not rotated counterclockwise, so that the second strap 22 would not be unwound from the reel 5 because the reel 5 is not rotated counterclockwise. Thereafter, the user continues rotating the controlling device 3 clockwise, so as to further wind the certain length of the second strap 22 around the reel 5.

Figure 14:
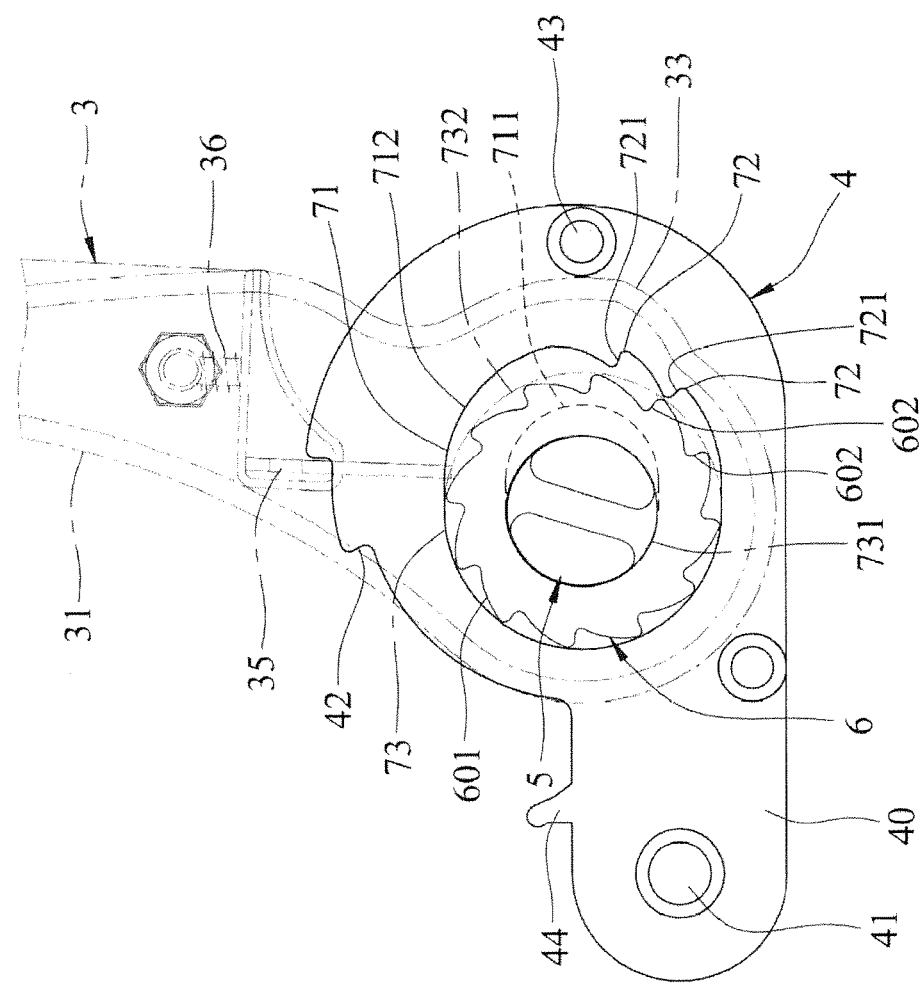
FIG. 14 is a side view of the second embodiment for showing a reel being freely rotatable under one state.

Referring to FIG. 14, a first unwinding method is described. When the user wants to unwind the second strap 22 from the reel 5, the user presses the pawl plate 35 toward the elastic member 36 so as to disengage the pawl plate 35 from the ratchet set 6, and then rotates the controlling device 3 clockwise until the ratchet buckle is completely unfolded, wherein each extruded portion 43 abuts against each corresponding extending portion 33 so that the controlling device 3 moves the reel 5 in the first through portion 711 of each first through hole 71 and moves the ratchet set 6 in the first receiving portion 712 of each first through hole 71, so as to disengage the first engaging portion 721 of each first pawl member 72 from the ratchet set 6. As a result, the reel 5 is freely rotated clockwise or counterclockwise because the ratchet set 6 is not engaged with the first pawl members 72 and the second pawl members 74.

Figure 15:
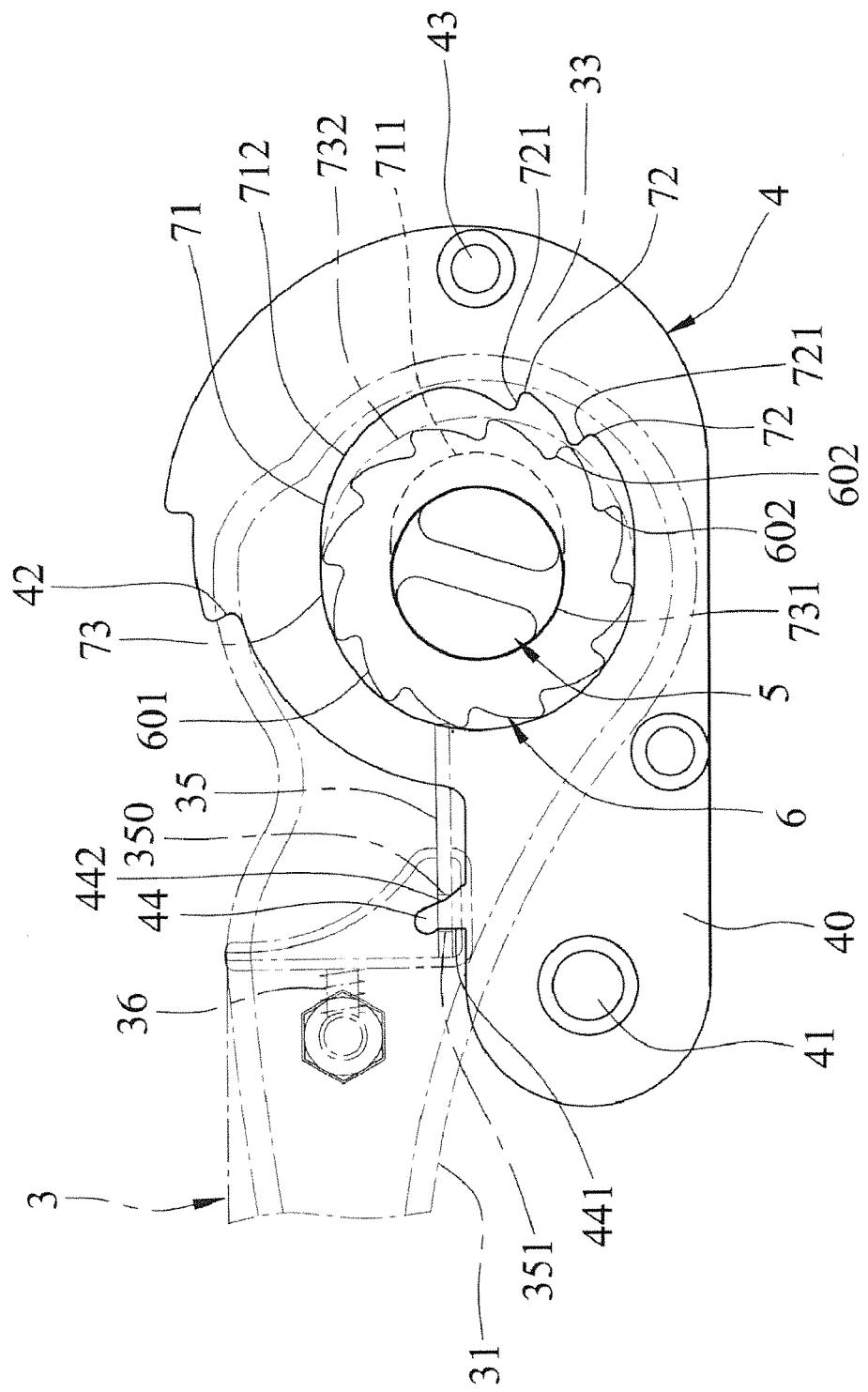
FIG. 15 is a side view of the second embodiment for showing a reel being freely rotatable under another state.

Referring to FIG. 15, a second unwinding method is described. When the user wants to unwind the second strap 22 from the reel 5, the user holds the handle 32 and pulls the controlling device 3 away from the reel 5 to a unlock position, and rotates the controlling device 3 counterclockwise until each first abutting face 351 of the pawl plate 35 abuts against the lateral face 441 of each corresponding catch member 44 and the ratchet buckle is completely folded up; wherein, each extending portion 33 moves the reel 5 in the first through portion 711 of each first through hole 71, so as to disengage the first engaging portion 721 of each first pawl member 72 and the second engaging portion 741 of each second pawl member 74 from the ratchet set 6. As a result, the controlling device 3 is locked so as to prevent each first pawl member 72 and each second pawl member 74 from being engaged with the ratchet set 6 once more, so that the reel 5 is freely rotated clockwise or counterclockwise because the ratchet set 6 is not engaged.

Figure 16:
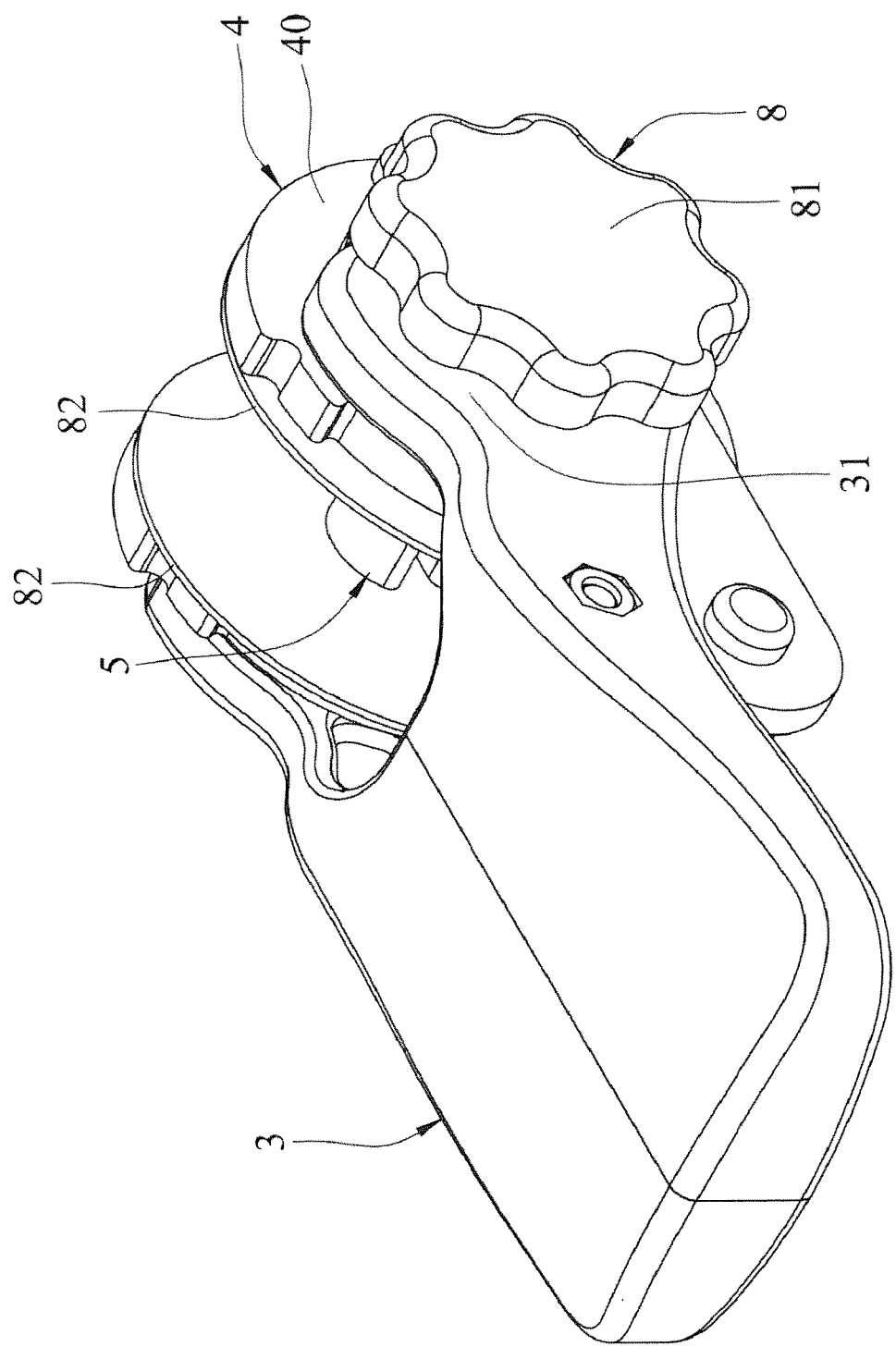
FIG. 16 is a perspective view of the third embodiment of the present invention.

Referring to FIG. 16, a third embodiment of the present invention is described as following (only the differences between said embodiments and the third embodiment are further described). A ratchet buckle in accordance with the third embodiment comprises a controlling device 3, an operating device 4, a reel 5, a ratchet set 6, as said embodiments (as shown in FIGS. 2 and 10). The ratchet buckle further comprises a roll set 8. The roll set 8 has a roll wheel 81 and two receiving plates 82. The roll wheel 81 is fixed to the reel 5 and is configured to rotate the reel 5. The roll wheel 81 is set at an outer side of one connector 31 of the controlling device 3. The reel 5 passes through each receiving plate 82. Each receiving plates 82 is rotatable via the rotation of the reel 5. Each receiving plates 82 is set at an inner side of each corresponding wall member 40 of the operating device 4. The two receiving plates 82 are spaced from each other.

One end of the second strap 22 is connected to the reel 5, and is wound around the reel 5 so as to be received between the two receiving plates 82. Under this arrangement, the user just pulls the second strap 22 so as to wind the second strap 22 around the reel 5. Therefore, the user doesn't need to pass one end of the second strap 22 through the reel 5 as said embodiments. Specially, when the user wants to wind the second strap 22 around the reel 5, the user just rotates the roll wheel 81 so as to have the reel 5 rotate and wind the second strap 22 therearound.

In addition, an elastomer might be assembled between the reel 5 and one wall member 40 of the operating device 4 (not shown). When an outer force to unwind the second strap 22 disappears, a recovery force of the elastomer has the roll wheel 81 automatic rotate counterclockwise so as to wind the second strap 22 once more.

All in all, the advantages of the present invention are shown as following:

First, the strain of the second strap 22 have the ratchet set 6 be always engaged with the two first pawl members 72; in other words, the user never worries that the ratchet set 6 might be unexpectedly disengaged from the first pawl members 72 during operation.

Figure 1:
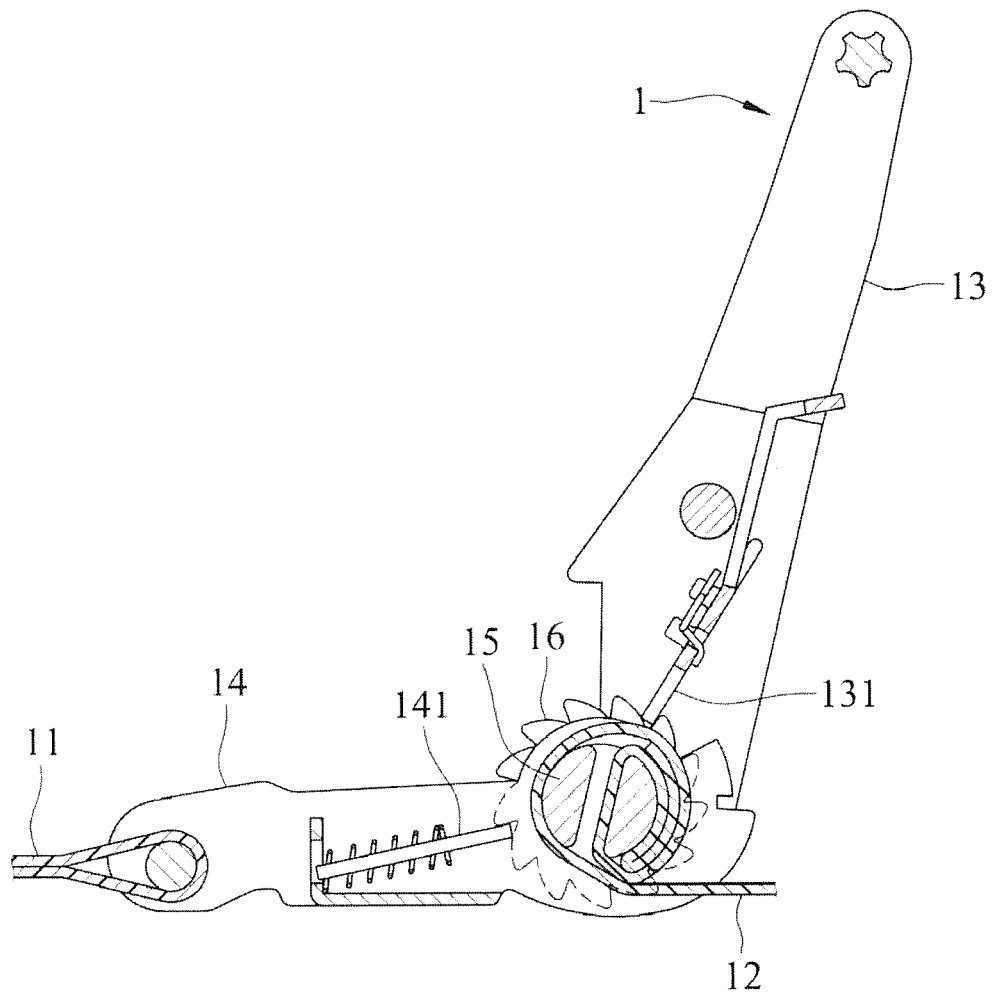
FIG. 1 is a cross-sectional view of a prior art.

Second, the first embodiment does not need the elastic plate 131 and the elastic pawl 141 as shown in FIG. 1 for making the ratchet set 6 unidirectionally rotatable, because of the arrangement of the first pawl members 72, the second pawl members 74 and the controlling device 3. Therefore, the first embodiment of the present invention is lighter and has lower cost than prior arts.

Third, under the first embodiment, when the user wants to unwind the second strap 22 from the reel 5, the user moves and rotates the controlling device 3 smoothly with only one hand thereof; therefore, it's very convenient for the user to operate.

Fourth, under the first embodiment, the disengagement makes quieter noise than prior arts as shown in FIG. 1, because the plate unit 131 or the elastic pawl 141 is disengaged from the ratchet wheels 16, via elasticity thereof. Therefore, the first embodiment of the present invention is suitable at night.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A ratchet buckle, which is configured to connect a first strap and a second strap, comprising:
   a controlling device;
   an operating device connected to the first strap;
   a reel passing through the controlling device and the operating device along an axial line, the second strap wound around the reel;
   a pawl device having a first through hole and at least one first pawl member, the first through hole formed through the operating device, along the axial line, the reel passing through the through hole, the first pawl member defined on an inner wall of the first through hole; and
   at least one ratchet set mounted on the reel, the reel being not rotated relative to the ratchet set, at least a portion of the ratchet set received in the first through hole, the ratchet set movable in the first through hole via an outer force, between a first position under which the first pawl member is engaged with the ratchet set so that the ratchet set is rotatable in one direction, and a second position under which the first pawl member is disengaged from the ratchet set so that the ratchet set is rotatable in the one direction or another opposite direction.

2. The ratchet buckle as claimed in claim 1, wherein a strain of the second strap drives the reel at the first position.

3. The ratchet buckle as claimed in claim 1, wherein the operating device has two wall members and a rod member; the two wall members are spaced from each other; the rod member is connected between two ends of the two wall members; the rod member is connected to the first strap; there are two ratchet sets; there are two first through holes and two first pawl members; each first through hole is formed on each corresponding wall member; each first through hole has a first through portion and a first receiving portion; a diameter of the first through portion is longer than that of the reel; a diameter of the first receiving portion is longer than that of the first through portion; the first receiving portion is configured to receive the ratchet set; each first pawl member has a first engaging portion; the first engaging portion corresponds to the engaging faces.

4. The ratchet buckle as claimed in claim 3, wherein the controlling device has two connectors and a handle; the two connectors is connected to the reel; the handle is connected between the two connectors; the pawl device has two second through holes and two second pawl members; each second through hole is formed on each corresponding connector therethrough, along the axial line; the reel passes through the two second through holes; each second pawl member is defined on an inner wall of each corresponding second through hole; another portion of the ratchet set received in the first through hole; each second pawl member has a second engaging portion corresponding to the engaging faces; the engaging portions rotate the ratchet set when the operating device is rotated clockwise, and disengage from the ratchet set when the operating device is rotated counterclockwise.

5. The ratchet buckle as claimed in claim 4, wherein the ratchet set has a plurality of disengaging faces and a plurality of engaging faces; the disengaging faces are extended from a periphery of the ratchet set; each engaging face is adjacent to each corresponding disengaging face; each engaging face is configured to engaged with one engaging portion.

6. The ratchet buckle as claimed in claim 4, wherein the controlling device has two extending portions; each extending portion is defined at one end of each corresponding connector; the operating device has two extruded portions; each extruded portion is formed at each corresponding wall member; each extruded portion abuts against each corresponding extending portion so that the controlling device moves the reel in the first through hole and moves the ratchet set in the first through hole to a second position, so as to disengage each first pawl member from the ratchet set; as a result, the reel at the second position is freely rotated clockwise or counterclockwise.

7. The ratchet buckle as claimed in claim 6, wherein the controlling device has two first abutting faces formed at the connectors; the operating device has two catch members; each catch member is formed at each corresponding wall member and is back on to each corresponding extruded portion; each catch member is spaced from each corresponding extruded portion; when the controlling device is rotated counterclockwise until the first abutting face abuts against each corresponding catch member, the controlling device moves the reel in each first through hole, so as to disengage each first pawl member and each second pawl member from the ratchet set at the second position; as a result, the reel is freely rotated clockwise or counterclockwise.

8. The ratchet buckle as claimed in claim 7, wherein the controlling device has two second abutting faces formed at the connectors; each second abutting faces is back on to the first abutting face; each catch member has an inclined face opposite to each corresponding extruded portion; the inclined face is inclined from a top end thereof to a bottom end thereof; the bottom end is closer to each corresponding extruded portion than the top end of the inclined face; when the controlling device is rotated counterclockwise, so as to have the inclined face abut against the second abutting face of each corresponding extending rod; then, the controlling device moves the reel toward each first pawl member in each corresponding first through hole, with the abutting relation between the inclined face and the second abutting face of each corresponding extending rod, until the ratchet buckle is completely folded up; as a result, the ratchet set is engaged with each first pawl member.

9. The ratchet buckle as claimed in claim 3, wherein the controlling device has two connectors, a handle, at least one pawl plate and at least one elastic member; the two connectors is connected to the reel; the handle is connected between the two connectors; the pawl plate is movably assembled between the two connectors; the elastic member is assembled on the pawl plate and the two connectors; a recovery force of the elastic member has the pawl plate engage with the ratchet set; the pawl plate rotates the ratchet set when the operating device is rotated clockwise, and disengage from the ratchet set via the elastic member when the operating device is rotated counterclockwise.

10. The ratchet buckle as claimed in claim 9, wherein the controlling device has two extending portions; each extending portion is defined at one end of each corresponding connector; the operating device has two extruded portions; each extruded portion is formed at each corresponding wall member; each extruded portion abuts against each corresponding extending portion so that the controlling device moves the reel in the first through hole and moves the ratchet set in the first through hole to a second position, so as to disengage each first pawl member from the ratchet set; as a result, the reel at the second position is freely rotated clockwise or counterclockwise.

11. The ratchet buckle as claimed in claim 10, wherein the controlling device has two first abutting faces formed at the connectors; the operating device has two catch members; each catch member is formed at each corresponding wall member and is back on to each corresponding extruded portion; each catch member is spaced from each corresponding extruded portion; when the controlling device is rotated counterclockwise until the first abutting face abuts against each corresponding catch member, the controlling device moves the reel in each first through hole, so as to disengage each first pawl member and each second pawl member from the ratchet set at the second position; as a result, the reel is freely rotated clockwise or counterclockwise.

12. The ratchet buckle as claimed in claim 11, wherein the controlling device has two second abutting faces formed at the connectors; each second abutting faces is back on to the first abutting face; each catch member has an inclined face opposite to each corresponding extruded portion; the inclined face is inclined from a top end thereof to a bottom end thereof; the bottom end is closer to each corresponding extruded portion than the top end of the inclined face; when the controlling device is rotated counterclockwise, so as to have the inclined face abut against the second abutting face of each corresponding extending rod; then, the controlling device moves the reel toward each first pawl member in each corresponding first through hole, with the abutting relation between the inclined face and the second abutting face of each corresponding extending rod, until the ratchet buckle is completely folded up; as a result, the ratchet set is engaged with each first pawl member.

13. The ratchet buckle as claimed in claim 1, wherein the ratchet buckle further comprises a roll set; the roll set has a roll wheel and two receiving plates; the roll wheel is fixed to the reel and is configured to rotate the reel; the roll wheel is set at an outer side of the controlling device; the roll wheel is rotated so as to have the reel rotate and wind the second strap therearound.

* * * * *